United States Patent [19]

Lukens et al.

[11] 4,031,814

[45] June 28, 1977

[54] SELF-CENTERING SPRING ACTUATED AUXILIARY BRAKE MECHANISM

[75] Inventors: Robert T. Lukens, Plymouth; Stanley Jaksim, Detroit, both of Mich.

[73] Assignee: Indian Head Inc., New York, N.Y.

[22] Filed: Feb. 2, 1976

[21] Appl. No.: 654,033

[52] U.S. Cl. .................................... 92/63; 92/64
[51] Int. Cl.² ........................................ F01B 7/00
[58] Field of Search ............... 188/170; 303/6 M; 192/91 A, 91 R; 92/63, 64, 130 A, 222, 223, 171; 308/239, DIG. 8

[56] References Cited

UNITED STATES PATENTS

| 1,386,766 | 8/1921 | Centervall | 92/223 |
| 3,331,291 | 7/1967 | Rumsey | 92/64 X |
| 3,479,927 | 11/1969 | Woodward | 92/130 A X |
| 3,563,139 | 2/1971 | Page et al. | 92/64 X |
| 3,811,365 | 5/1974 | Gordon et al. | 92/130 A X |
| 3,908,520 | 9/1975 | Ma | 92/64 |

FOREIGN PATENTS OR APPLICATIONS 1,285,152  8/1972  United Kingdom ............... 188/170

*Primary Examiner*—George E. A. Halvosa
*Attorney, Agent, or Firm*—Phillips, Moore, Weissenberger, Lempio & Majestic

[57] ABSTRACT

A fluid brake actuating mechanism is described which includes a service brake chamber and a spring actuated auxiliary brake chamber. A device for centering the spring in the auxiliary brake chamber, not only under static conditions, but also under dynamic conditions by guiding the auxiliary piston plate during movement thereof is disclosed. The adaptation of the centering device for brake actuating mechanisms of different structures is described.

9 Claims, 3 Drawing Figures

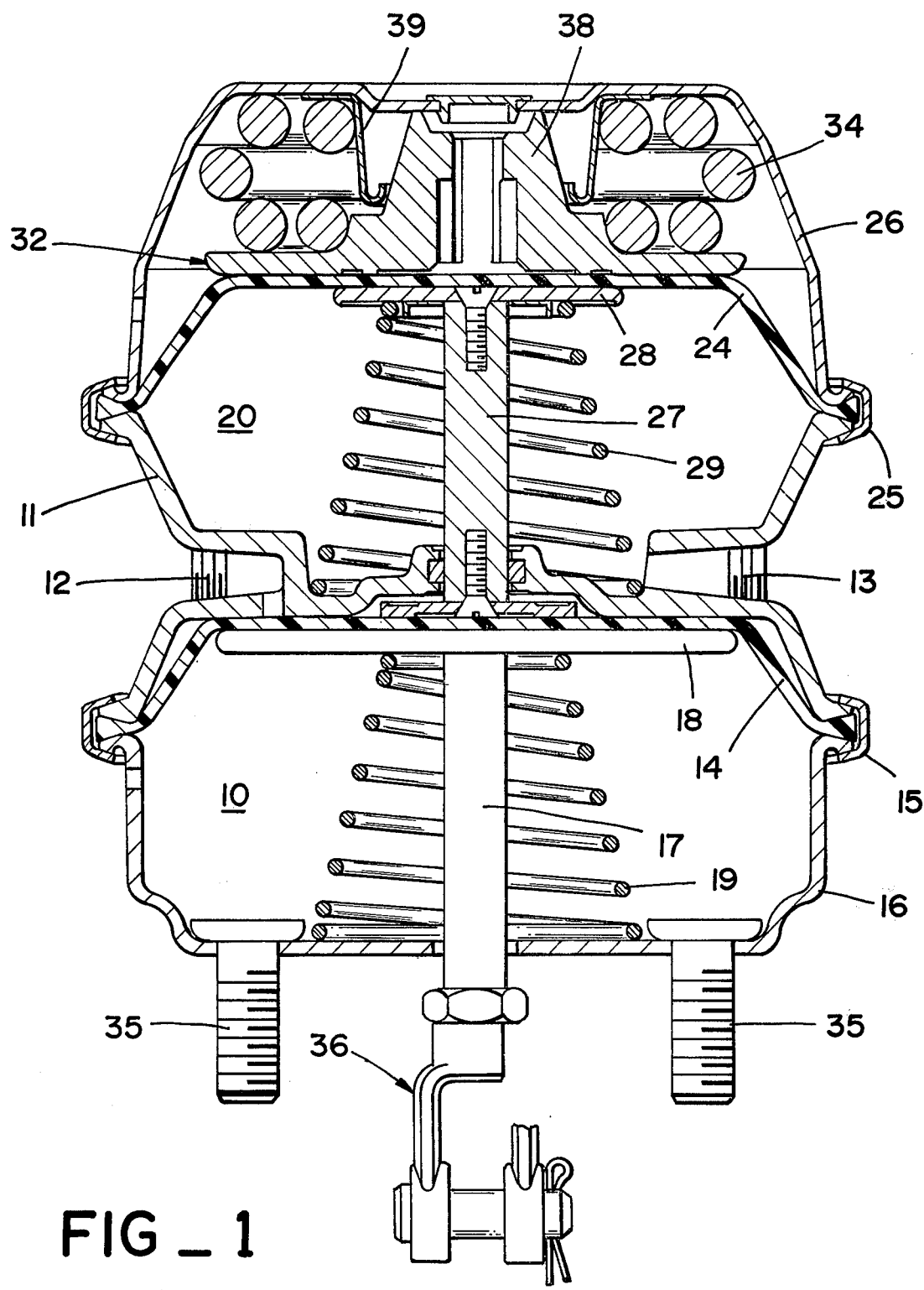
FIG_1

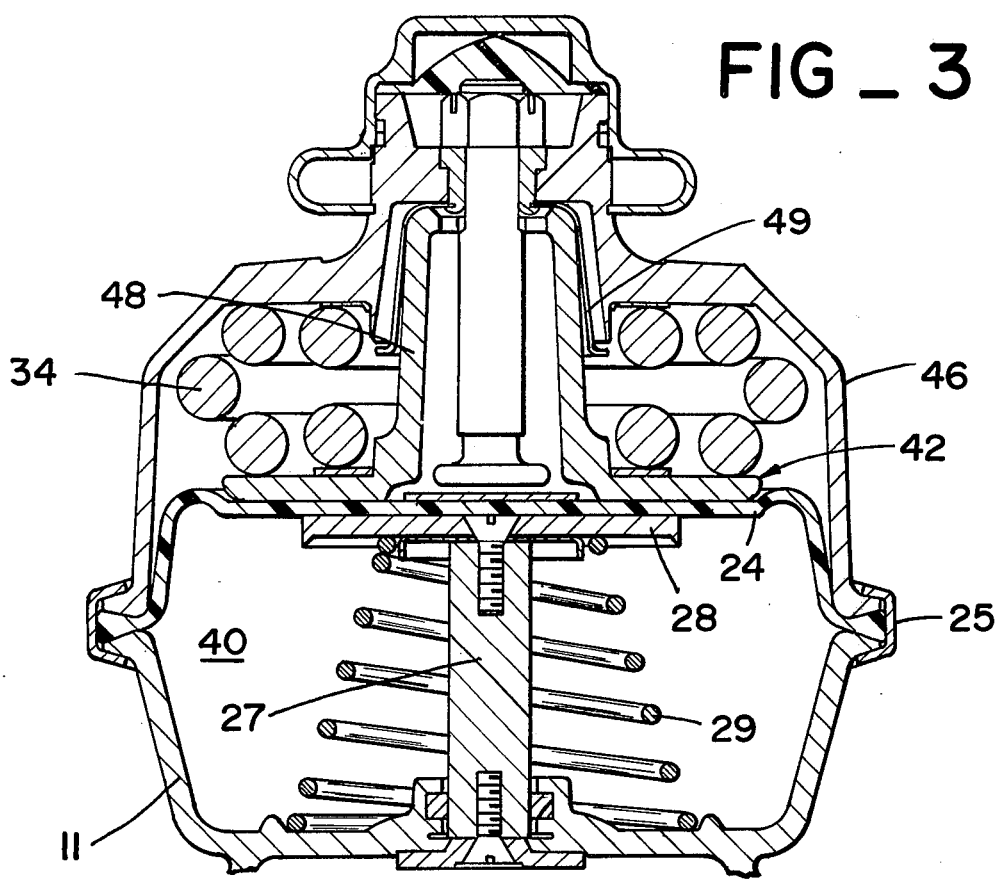
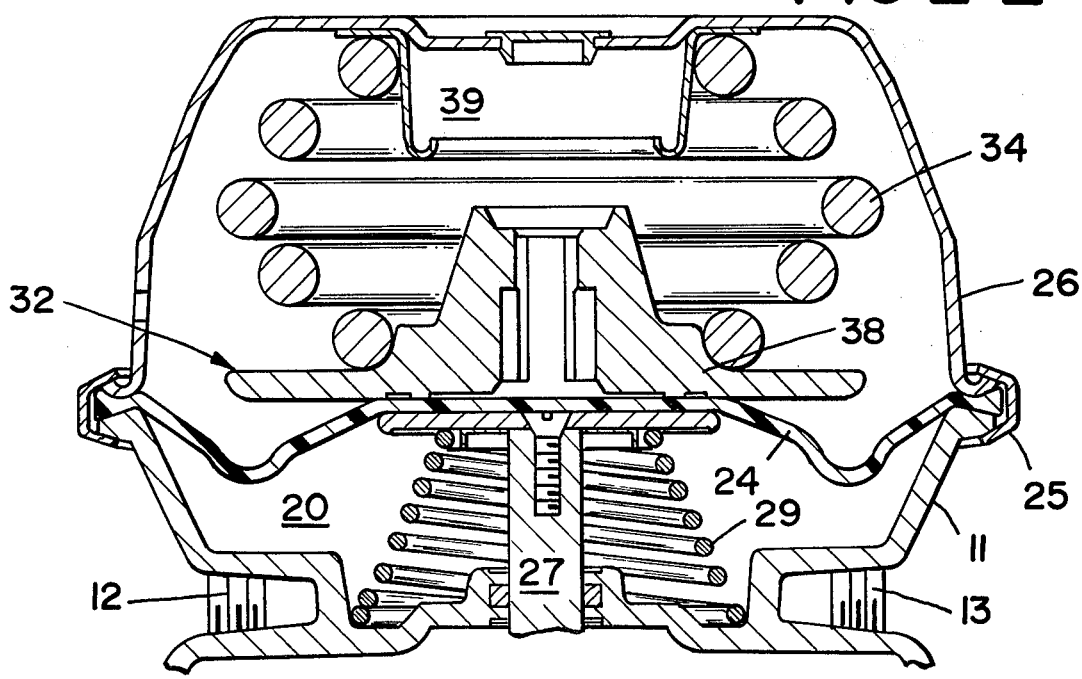

SELF-CENTERING SPRING ACTUATED AUXILIARY BRAKE MECHANISM

BACKGROUND OF THE INVENTION

This invention relates to a fluid brake actuating mechanism including a service brake chamber and a spring actuated auxiliary brake chamber and more particularly to an improved means for centering and guiding the spring and piston of the spring actuated auxiliary brake mechanism.

Modern trucks and other heavy duty vehicles are normally equipped with pneumatic braking systems which are operated from a main pneumatic pressure source. Since a failure of the main pneumatic pressure source will interrupt the normal operation of such braking systems, it is now conventional to provide a spring actuated auxiliary brake mechanism which will automatically apply the service brakes in the event of a loss of pressure in the main pneumatic pressure source.

Thus the brake actuating mechanism of such pneumatic braking systems conventionally comprise a service brake chamber including a piston and rod assembly together with an impervious flexible diaphragm arranged so that the application of pneumatic pressure to one side of the diaphragm will cause the piston and rod assembly to move in the braking direction. A light helical compression spring is also provided in the service brake chamber to return the piston and rod assembly in the non-braking direction on removal of the pneumatic pressure.

A spring actuated auxiliary brake chamber is normally provided in tandem with the service brake chamber and includes a piston and heavy duty helical compression spring assembly together with a flexible impervious diaphragm arranged so that the application of pneumatic pressure to one side of the diaphragm will move the piston to compress the helical compression spring. A brake actuating rod assembly is provided on the opposite side of the flexible impervious diaphragm from the piston and is adapted to project into the service brake chamber and bear against the opposite side of the flexible diaphragm therein from the piston and rod assembly thereof when the helical compression spring of the auxiliary brake chamber is extended. Thus in normal operation, pneumatic pressure from the main pneumatic pressure source is applied to the auxiliary brake chamber to cause the piston thereof to compress the heavy duty helical compression spring. A light helical compression spring is provided in the auxiliary brake chamber to hold the brake actuating rod thereof in contact with the flexible impervious diaphragm so that the brake actuating rod does not normally project into the service brake chamber. Upon failure of the main pneumatic pressure source the heavy duty helical compression spring of the auxiliary brake chamber will drive the brake actuating rod into the service brake chamber and against the flexible impervious diaphragm thereof forcing the piston and rod assembly of the service brake chamber to move in the brake actuating direction.

the rod of the piston and rod assembly of the service brake chamber provides for self-centering of such piston and rod assembly during operation. Similarly, the brake actuating rod of the auxiliary brake chamber is self-centering in operation. However, the piston of the auxiliary brake chamber is essentially floating within the auxiliary brake chamber under the influence of the forces exerted thereon by the heavy duty compression spring and the flexible impervious diaphragm. Thus, appropriate means must be provided for centering the piston of the auxiliary brake chamber in operation.

It is the basic object of this invention to provide an improved means for centering the piston of a spring actuated auxiliary brake mechanism in operation.

In the prior art, various means for centering the piston of a spring actuated brake chamber in operation have been proposed based on the use of elongated concentric rods and cylinders in various arrangements. However, such arrangements have tended to add to the axial length of the auxiliary brake chamber.

It is another object of this invention to provide an improved means for centering the piston of a spring actuated auxiliary brake chamber in operation while reducing the axial length requirements for such chamber toward minimum.

It has also been proposed in the prior art to form the housing or head of the auxiliary brake chamber as well as the piston thereof with interfitting cavities and protuberances in order to provide for the entering of such piston in operation. However, such structures have been difficult and expensive to fabricate and have a given operational life imposed by the characteristics of the material which can be so formed in view of the wear which results due to the contact of surfaces thereof under pressure in operation.

It is a further object of this invention to provide an improved auxiliary brake actuating chamber providing for the centering of the piston thereof in operation which is simple and inexpensive to fabricate and which will have increased life in operation.

SUMMARY OF THE INVENTION

Briefly, a spring actuated auxiliary brake chamber according to this invention comprises a generally cylindrical cup-like head and an emergency piston received within such head for axial movement therewithin. The piston provides a first flat surface facing the open end of the cup-like head and extending in a plane substantially perpendicular to the axis thereof and a second surface opposite to the first surface providing a boss of generally circular cross-section extending along a substantial portion of the axis of the cup-like head and having its maximum external diameter at the free end thereof. A helical compression spring is received about the boss on the piston between the piston and the bottom of the cup-like head with one end of the helical compression spring bearing on the piston and the other end of the helical compression spring bearing on the interior of the bottom of the cup-like head. A thin walled tubular guide member having a tubular portion of generally circular cross-section is received within the helical compression spring coaxially of the cup-like head. The tubular portion of the guide member has its minimum diameter larger than the maximum external diameter of the boss of the piston at one end thereof. One end of the guide member is adapted to abut the interior of the bottom of the cup-like head and the tubular portion of the guide member extends to an open free end spaced a substantial distance from the bottom of the cup-like member whereby the boss of the piston is received within the guide member when the helical compression spring is compressed. At least one of the cross-section of the boss and the cross-section of the tubular portion of the guide member changes in diameter along the axial length thereof.

BRIEF DESCRIPTION OF THE DRAWING

The foregoing and other objects and features of this invention will be more fully understood from the following detailed description of preferred embodiments thereof when read in conjunction with the attached drawing wherein;

FIG. 1 is a cross-sectional view of a brake actuating mechanism according to one embodiment of this invention with the elements thereof shown in their inactive or brake released position.

FIG. 2 is a fragmentary cross-sectional view of the spring actuated auxiliary brake chamber of the brake actuating mechanism of FIG. 1 with the elements thereof shown in their emergency brake actuating position.

FIG. 3 is a fragmentary cross-sectional view of a spring actuated auxiliary brake chamber according to another embodiment of this invention with the elements thereof shown in their non-actuating position.

DETAILED DESCRIPTION OF PREFERRED EMBODIMENTS

Referring to FIG. 1, a pneumatic brake actuating mechanism including the improvement of this invention according to one embodiment thereof is shown in cross-section. The brake actuating mechanism of FIG. 1 comprises a service brake chamber 10 shown in the bottom portion of the Figure and a spring actuated auxiliary brake chamber 20 shown in the upper portion of the Figure.

As shown in FIG. 1, the brake actuating mechanism includes a pneumatic case 11 formed to provide a pair of cups opening in opposite directions and having a common bottom, one of such cups forming a portion of the service brake chamber 10 and the other of the cups forming a portion of the auxiliary brake chamber 20. The casing 11 also provides a pneumatic pressure inlet port 12 communicating with the interior of the cup which forms a portion of the service brake chamber 10 and a pneumatic pressure inlet port 13 which communicates with the interior of the cup which forms a portion of the auxiliary brake chamber 20.

A flexible impervious diaphragm 14 extends across the open end of the cup of the case 11 which forms a portion of the service brake chamber 10 and is sealed thereto by means of a clamp member 15 which compressively holds the open end of a cup-like service brake housing 16 thereagainst. A brake actuating piston rod 17 is received through a centrally located aperture in the bottom of the housing 16 and has its inner end fixedly secured to a piston 18. A light helical compression spring 19 adapted to spring bias the piston 18 and piston rod 17 to the position shown in FIG. 1 is received within the service brake chamber 10 about the piston rod 17 with one end thereof bearing on the interior of the bottom of the housing 16 and the other end thereof bearing on the piston 18.

Similarly, a flexible impervious diaphragm 24 extends across the open end of the cup of the casing 11 which forms a portion of the auxiliary brake chamber 20 and is sealed thereto by a clamp member 25 which compressively holds the open end of a cup-like head 26 thereagainst. A push rod 27 is sealed through a centrally located aperture in the common bottom of the cups of the case 11 for sliding axial movement. One end of the push rod 27 is adapted to engage the piston 18 of the service brake chamber 10 through the diaphragm 14 and the other end of the push rod 27 extends into fixed engagement with a push rod plate 28 within the auxiliary brake chamber 20. A light helical compression spring 29 adapted to spring bias the push rod plate 28 and push rod 27 to the position shown in FIG. 1 is received about the push rod 27 within the auxiliary brake chamber 20 with one end thereof bearing against the bottom of the cup of the casing 11 which forms a portion of the auxiliary brake chamber 20 and the other end thereof bearing against the push rod plate 28.

An auxiliary brake actuating piston 32 is carried within the head 26 on the opposite side of the diaphragm 24 from that engaged by the push rod plate 28. The auxiliary brake piston 32 is spring biased to compressively abut the push rod plate 28 through the diaphragm 24 by means of a heavy helical compression spring 34 having one end in compressive engagement with the auxiliary brake actuating piston 32 and the other end compressively engaging the bottom of the cup-like head 26. In accordance with the teaching of the prior art, the heavy helical compression spring 34 is forced to its compressed state as shown in FIG. 1 by pneumatic pressure introduced into the auxiliary brake chamber 20 through the inlet port 13. Such pneumatic pressure acting on the diaphragm 28 causes the brake actuating piston 32 to move to the position shown against the force of the compression spring 34 and is maintained constant so long as there is no failure in the main pneumatic pressure source.

Thus, under normal conditions, the brakes are actuated by pneumatic pressure selectively applied to the inlet port 12 and acting on the diaphragm 14 to move the piston 18 and piston rod downwardly in the service brake chamber 10 to apply the brakes of the vehicle. As shown in FIG. 1, the brake actuating mechanism may be mounted on the vehicle by means of the bolts 35 projecting from the housing 16 and appropriate means 36 may be provided to mechanically couple the free end of the brake actuating rod 17 to the brake system (not shown).

Thus, it will be understood that the service brake piston 18 and brake actuating rod 17 tend to be inherently centered within the service brake actuating chamber 10 in operation. Similarly, the push rod 27 and push rod plate 28 tend to be inherently centered within the auxiliary brake actuating chamber 20 in operation.

However, referring to FIGS. 1 and 2, it will be seen that the auxiliary brake actuating piston 32 is essentially floating on top of the diaphragm 24 within the auxiliary brake actuating chamber 20 under the influence of the helical spring 34 during its travel from the position thereof shown in FIG. 1 to the position thereof shown in FIG. 2 and vice versa. Thus, upon failure of the main pneumatic pressure source, the helical compression spring 34 will force the piston 32 against the diaphragm 24 and push rod plate 28 resulting in movement thereof from their position shown in FIG. 1 to their position shown in FIG. 2 to automatically apply the brakes of the vehicle. When the main pneumatic pressure source is repaired, pneumatic pressure will be reestablished within the chamber 20 and will act on the diaphragm 24 to return the piston 32 to its position shown in FIG. 1 compressing the helical compression spring 34 and allowing the push rod 27 and push rod plate 28 to return to their positions shown in FIG. 1.

According to this invention, the centering of the auxiliary brake actuating piston 32 within the chamber 20 is insured during the movement thereof described above by means of the upwardly extending axial boss 38 provided on the piston 32 which boss 38 is received within the tubular guide member 39 which projects downwardly from the bottom of the cup-like head 26 coaxially therewith and within the helical compression spring 34. Thus, contact between the outer surface of the boss 38 and the inner periphery of the guide member 39 will center the piston 32 particularly during the course of its movement from the position shown in FIG. 2 where there is no pneumatic pressure present in the chamber 20 and the force exerted by the helical compression spring is at a minimum to the position shown in FIG. 1 when there is maximum pneumatic pressure in the chamber 20 and the force exerted by the helical compression spring 34 on the piston 32 is at a maximum.

The boss 38 of the piston 32 is preferably of circular cross-section and as shown in FIGS. 1 and 2, the diameter of the boss decreases from a maximum adjacent the piston body 32 to a minimum at the free end thereof. The tubular guide member 39 has a minimum internal diameter sightly larger than the maximum external diameter of the boss 38. The piston 32 including the boss 38 is preferably made of die cast or molded aluminum. The tubular guide member 39 is a relatively thin walled steel stamping provided with an internally reentrant radious at its free end and an outwardly extending flange for engagement with the bottom of the cup-like head 26. As shown in FIGS. 1 and 2, the bottom of the cup-like head 26 may be provided with a depression or centering shoulders to be received within the tubular member 39 and the tubular member 39 and such depression or shoulders may be dimensioned with respect to the compression spring 34 such that the tubular member 39 is maintained in compressive contact with the interior of the bottom of the cup-like head 26 by the force of the compression spring 34. The tubular guide member 39 is coated with a phosphate and oil surface and further lubricated with light grease.

It has been found that upon compression of the spring 34 by movement of the piston from its position shown in FIG. 2, to its position shown in FIG. 1, there is a load component that tends to cause movement of the piston 32 transversely of the axis of the chamber 20. The radius on the inside diameter of the spring guide will thus tend to contact the exterior of the boss 38 on the piston before the force of the spring 34 has reached its maximum thereby restricting the transverse motion of the piston 32 and tending to center the piston 32 within the chamber 20.

In the prior art, similar attempts were made to accomplish such centering by forming mating parts on the auxiliary brake actuating piston and the head of the auxiliary brake chamber. However, it was necessary to make both the piston and the head of aluminum or other similar material which could be die cast or molded to provide the mating parts without excessive expense. It was found that when two surfaces of identical metal such as aluminum rub together under heavy loads, excessive abrading of the surfaces results and that no known lubricant would help to reduce such abrasion. According to this invention, the aluminum of the boss 38 of the piston 32 rubs against a lubricated smooth steel surface resulting in a polishing action with greatly reduced abrasion characteristics. Actual tests have shown no detrimental galling or abrading of the contacting surfaces after a million operational cycles from the position shown in FIG. 1 to the position shown in FIG. 2 and back again, whereas a standard structure involving contacting surfaces of the same metals can be detrimentally abraded after only one thousand such cycles.

Referring to FIG. 3, a fragmentary cross-sectional view of a different brake actuating mechanism including an auxiliary brake actuating chamber 40 modified to include a further embodiment of this invention is shown. The structural elements of the device shown in FIG. 3 are substantially identical to that shown in FIGS. 1 and 2 except for the head 46, piston 42, boss 48 and tubular guide member 49. As shown in FIG. 3, the head 46 may be made of cast or molded aluminum with a cavity or socket formed in the bottom thereof to receive the boss 48 formed on a cast or molded aluminum piston 42.

However, according to the teaching of this invention, the cavity or socket in the bottom of the head 46 is made over-size for the boss 48 and a tubular guide member 49 of thin wall steel is interposed between the exterior surface of the boss 48 and the internal surface of the cavity or socket of the head 46. The tubular guide member 49 is preferably cup-shaped and mounted within the cavity or socket of the head 46 to receive the boss 48 of the piston 42. In the embodiment shown in FIG. 3, the guide member 49 is mounted on the head 46 by means of a grommet which extends through both the bottom of cup-shaped head 46 and the bottom cup-shaped tubular guide member 49.

However, the tubular guide member may also be mounted by similar means on the free end of the boss 48 for movement with the piston 42 and sliding contact with the internal surface of the cavity or socket of the head 46 and abutment with the bottom thereof. In either event, the interposition of the tubular guide member 49 between the aluminum surfaces of the boss 48 and the socket or cavity of the head 46 will avoid abrasion of the surfaces thereof upon operational cycling of the auxiliary brake actuating mechanism as described hereinabove.

As mentioned hereinabove, the boss 48 of the piston 42 is preferably circular in cross-section. However, as shown in FIG. 3, such cross-section remains substantially constant along the length thereof whereas the internal diameter of the tubular portion of the guide member 49 increases from a minimum at the cup-shaped bottom to a larger diameter at the open end thereof to limit the area of the sliding contact between the contacting surfaces and to produce the desired guiding action.

It is believed that those skilled in the art will make obvious modifications in the specific structure disclosed in the drawing hereof and described in the foregoing specification to adapt the teaching of this invention for use in various auxiliary brake actuating chambers known in the art. Dissimilar metals, other than aluminum and steel, may be used in practicing the teaching of this invention. However, these materials are preferred for economy and ease of fabrication.

Similarly, circular cross-sections are preferred for the boss and tubular member although other generally circular cross-sections may be usable in certain embodiments. It is necessary that the guide member include a portion of tubular cross-section and that both the guide member and the boss extend for a substantial distance along the axis of the auxiliary brake chamber. Finally, it is necessary according to this invention that one end of the guide member be adapted to abut the bottom of the head. It is also necessary that the minimum external diameter of the boss be at the free end thereof and that the tubular portion of the guide member be adapted to receive a substantial portion of the length of the boss. Although pneumatic brake actuating mechanisms are shown in the drawing and specifically described herein, this invention is applicable in brake actuating systems utilizing any pressurized fluid.

What is claimed is:

1. A brake actuating mechanism comprising a service brake chamber and a spring actuated auxiliary brake chamber, said spring actuated auxiliary brake chamber comprising:
    a. a generally cylindrical cup-like head made of a first metal;
    b. an emergency piston made of said first metal received within said head for axial movement therewithin, said piston providing a first flat surface facing the open end of said cup-like head and extending in a plane substantially perpendicular to the axis of said cup-like head and a second surface opposite said first surface providing a boss of generally circlar cross-section extending along a substantial portion of said axis of said cup-like head and having its minimum external diameter at the free end thereof;
    c. a helical compression spring received about said boss and between said second surface of said piston and the bottom of said cup-like head, one end of said helical compression spring bearing on said second surface of said piston and the other end of said helical compression spring bearing on the interior of said bottom of said cup-like head; and
    d. a thin-walled guide member made of a metal dissimilar from said first metal having a tubular portion of generally circular cross-section received within said helical compression spring coaxially of said cup-like head, said tubular portion of said guide member having internal dimensions adapted to receive a substantial portion of the length of said boss of said piston, said guide member having one end thereof adapted to abut the interior of said bottom of said cup-like head and extending to an open free end spaced a substantial distance from said bottom of said cup-like member whereby said boss of said piston is received within said guide member when said helical compression spring is compressed, at least one of said cross-section of said boss and said cross-section of said tubular portion of said guide member changing in diameter along the axial length thereof at a greater rate than the cross-section of the other.

2. A brake actuating mechanism as claimed in claim 1 wherein said guide member is made of steel and said emergency piston is made of aluminum.

3. A brake actuating mechanism as claimed in claim 1 wherein said cross-section of said boss increases in external diameter from said minimum diameter at the free end thereof.

4. A brake actuating mechanism as claimed in claim 3 wherein said guide member has a cross-section of minimum internal diameter at the free end thereof.

5. A brake actuating mechanism as claimed in claim 1 wherein said guide member has a cross-section of maximum internal diameter at the free end thereof.

6. A brake actuating mechanism as claimed in claim 1 wherein said one end of said guide member is held in compressive abutment with said interior of said bottom of said cup-like head by said helical compression spring.

7. A brake actuating mechanism as claimed in claim 6 wherein said one end of said guide member is provided with an outwardly extending flange interposed between said other end of said helical compression spring and said interior of said bottom of said cup-like head.

8. A brake actuating mechanism as claimed in claim 1 wherein said one end of said guide member is rigidly mounted on said interior of said bottom of said cup-like head.

9. A brake actuating mechanism as claimed in claim 1 wherein said boss and said guide member each have an axial length about equal to one quarter of the internal axial length of said auxiliary brake actuating chamber.

* * * * *

UNITED STATES PATENT OFFICE
CERTIFICATE OF CORRECTION

Patent No. 4,031,814     Dated June 28, 1977

Inventor(s) ROBERT T. LUKENS and STANLEY JAKSIM

It is certified that error appears in the above-identified patent and that said Letters Patent are hereby corrected as shown below:

Column 1, line 62 - Change "the" (first occurrence) to --The--.

Column 2, line 22 - Change "entering" to --centering--.

Column 5, line 27 - Change "radious" to --radius--.

Column 7, line 23 - Change "circlar" to --circular--.

Signed and Sealed this

Sixth Day of February 1979

[SEAL]

Attest:

RUTH C. MASON
*Attesting Officer*

DONALD W. BANNER
*Commissioner of Patents and Trademarks*